US011537343B2

(12) United States Patent
Okada (10) Patent No.: US 11,537,343 B2
(45) Date of Patent: Dec. 27, 2022

(54) SERVER AND PRINTING SYSTEM

(71) Applicant: SEIKO EPSON CORPORATION, Tokyo (JP)

(72) Inventor: Hiromu Okada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/645,111

(22) Filed: Dec. 20, 2021

(65) Prior Publication Data
US 2022/0197577 A1    Jun. 23, 2022

(30) Foreign Application Priority Data

Dec. 21, 2020 (JP) .............................. JP2020-211190

(51) Int. Cl.
*G06F 15/00* (2006.01)
*G06F 3/12* (2006.01)
*G06K 1/00* (2006.01)

(52) U.S. Cl.
CPC .......... *G06F 3/1269* (2013.01); *G06F 3/1205* (2013.01); *G06F 3/1225* (2013.01); *G06F 3/1236* (2013.01); *G06F 3/1288* (2013.01)

(58) Field of Classification Search
CPC .... G06F 3/1269; G06F 3/1205; G06F 3/1225; G06F 3/1236; G06F 3/1288
USPC ................................. 358/1.15, 1.14, 1.13, 1.1
See application file for complete search history.

(56) References Cited

U.S. PATENT DOCUMENTS

2013/0003117 A1* 1/2013 Hirata ................... G06F 3/1259
                                                    358/1.15
2019/0163411 A1* 5/2019 Kang .................... G06F 3/1285

FOREIGN PATENT DOCUMENTS

JP          2009-139991 A      6/2009

* cited by examiner

*Primary Examiner* — Douglas Q Tran
(74) *Attorney, Agent, or Firm* — Workman Nydegger (57) ABSTRACT

A server includes a server storage that stores a print job related information record in which a print job ID is associated with network information, a first acquirer that acquires a print request, a transmitter that transmits a print instruction to a terminal device based on the stored network information associated with the print job ID included in the print request acquired by the first acquirer, a second acquirer that acquires print job information from the terminal device, and an updater that updates, based on the acquired print job information, the stored print job related information record including the print job ID included in the print job information acquired by the second acquirer.

9 Claims, 8 Drawing Sheets

SERVER AND PRINTING SYSTEM

The present application is based on, and claims priority from JP Application Serial Number 2020-211190, filed Dec. 21, 2020, the disclosure of which is hereby incorporated by reference herein in its entirety.

BACKGROUND

1. Technical Field

The present disclosure relates to a server and a printing system.

2. Related Art

A technique is known in which a printing device performs printing based on a print job stored in a terminal device. For example, in a printing system described in JP-A-2009-139991, in authentication printing, a server transmits a print instruction to a terminal device after completion of authentication, the terminal device transmits a stored print job to a printing device based on the received print instruction, and the printing device performs printing based on the received print job.

However, in the system described in JP-A-2009-139991, when network information of the terminal device is changed in a network via which the terminal device and the server are connected to each other and able to communicate with each other, the server may be unable to transmit the print instruction to the terminal device.

SUMMARY

According to an aspect of the present disclosure, a server is configured to communicate via a network with a terminal device that stores a print job and a printing device that performs printing based on the print job received from the terminal device. The server includes a storage unit that stores association information in which identification information of the print job is associated with network information of the terminal device, a first acquirer that acquires a print request including the identification information from the printing device, a transmitter that transmits, to the terminal device, a print instruction to transmit the print job indicated by the identification information included in the acquired print request based on the network information stored in the storage unit and associated with the identification information included in the acquired print request when the first acquirer acquires the print request, a second acquirer that acquires print job information including the identification information and the network information from the terminal device, and an updater that updates, based on the acquired print job information, the association information stored in the storage unit and including the identification information included in the acquired print job information when the second acquirer acquires the print job information.

According to another aspect of the present disclosure, a printing system includes a terminal device that stores a print job, a printing device that performs printing based on the print job received from the terminal device, and a server configured to communicate with the terminal device and the printing device via a network. The terminal device includes a print job information transmitter that transmits, to the server, print job information including identification information of the print job and network information of the terminal device. The server includes a storage unit that stores association information in which the identification information is associated with the network information, a first acquirer that acquires a print request including the identification information from the printing device, a transmitter that transmits, to the terminal device, a print instruction to transmit the print job indicated by the identification information included in the acquired print request based on the network information stored in the storage unit and associated with the identification information included in the acquired print request when the first acquirer acquires the print request, a second acquirer that acquires the print job information from the terminal device, and an updater that updates, based on the acquired print job information, the association information stored in the storage unit and including the identification information included in the acquired print job information when the second acquirer acquires the print job information.

DESCRIPTION OF EXEMPLARY EMBODIMENTS

Figure 1:
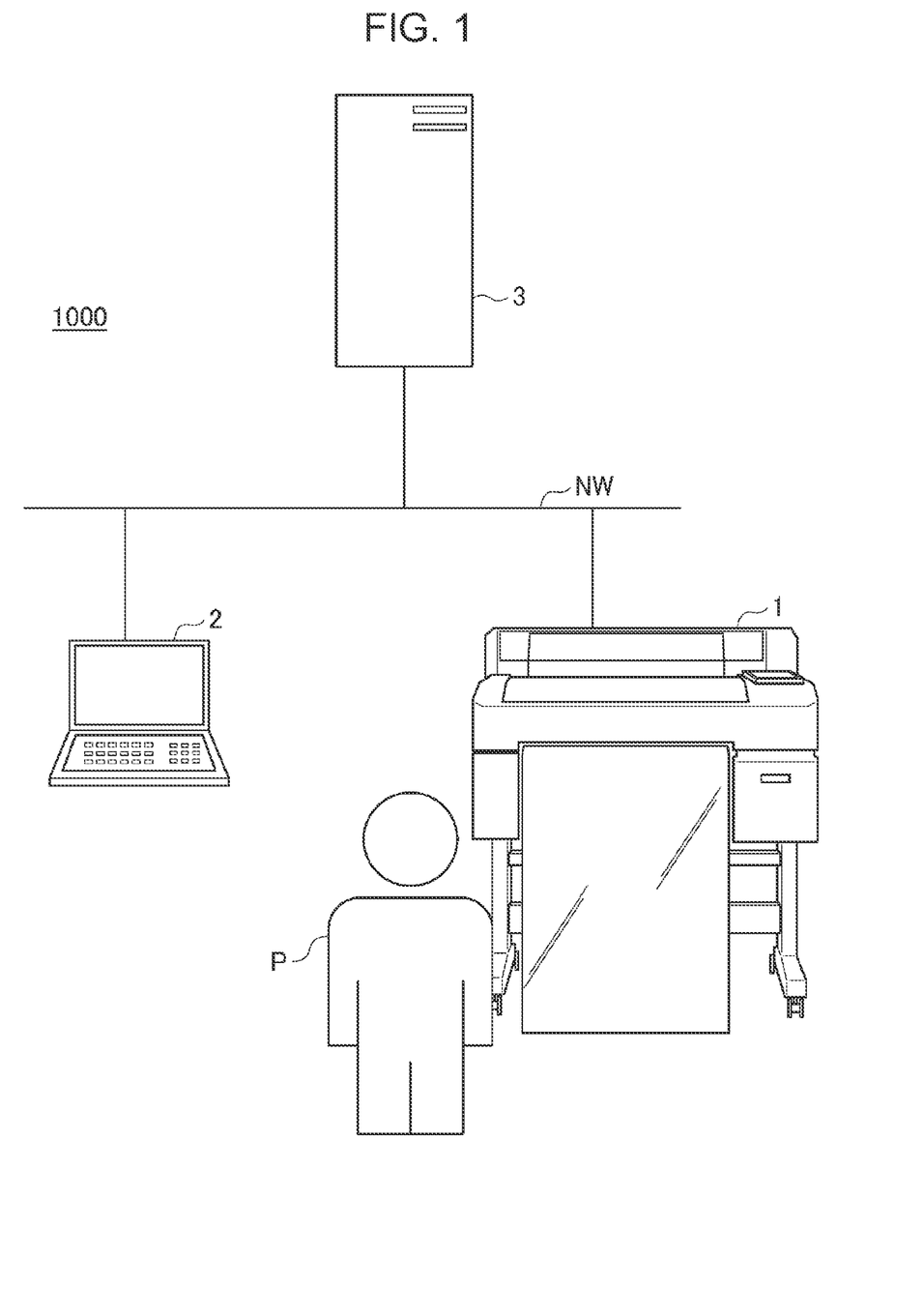
FIG. 1 is a diagram illustrating a configuration of a printing system.

FIG. 1 is a diagram illustrating a configuration of a printing system 1000.

As illustrated in FIG. 1, the printing system 1000 includes a printing device 1, a terminal device 2, and a server 3. The printing device 1, the terminal device 2, and the server 3 are connected to a network NW. The network NW may be a local network, a global network, or a network including the local network and the global network. The global network includes the Internet, a phone network, and another communication network.

The printing system 1000 performs authentication printing.

In the printing system 1000, in the authentication printing, the printing device 1 receives an operation relating to user authentication from a user P, and the server 3 performs the user authentication based on the received operation relating to the user authentication. Then, in the printing system 1000, in the authentication printing, when the user authentication is successful, the printing device 1 that received the operation relating to the user authentication performs printing based on a print job desired by the user P.

The printing device 1 prints an image onto a print medium. The type of the print medium is not limited. Examples of the print medium are cut paper of a predetermined size, roll paper, and a sheet made of synthetic resin. The printing by the printing device 1 is not limited and may be dot impact printing, heat sublimation printing, thermal printing, or the like.

The present embodiment exemplifies, as the printing device 1, a large format printer that ejects ink onto a print medium of a relatively large size using an ink jet method to perform printing on the print medium. As the print medium of the large format printer, high-quality paper, cast-coated paper, art paper, coated paper, synthetic paper, a film made of polyethylene terephthalate (PET), polypropylene (PP), or the like, fabric cloth, or the like can be used, for example.

The printing device 1 performs printing based on a print job 2152 received from the terminal device 2. When the printing device 1 receives an operation relating to user authentication and the user authentication is successful in the server 3, the printing device 1 performs the printing based on the print job 2152 received from the terminal device 2.

The terminal device 2 is a personal computer (PC). Although FIG. 1 exemplifies a laptop PC as the terminal device 2, the terminal device 2 may be a desktop PC, a tablet PC, or a smartphone. The terminal device 2 generates the print job 2152 by using a function of a printer driver 213 and stores the generated print job 2152 by using a function of a printing application 214.

The server 3 is a server device that executes predetermined arithmetic processing based on a request or the like from each of clients connected to the network NW. The server 3 transmits data based on a result of the arithmetic processing to each of the clients. In each drawing, the server 3 is represented by one block, which does not mean that the server 3 is constituted by a single server device. The server 3 may include a plurality of server devices. As long as the server 3 can perform various processes described later, the implementation of the server 3 is not limited.

The server 3 provides, to the printing device 1, various screens relating to printing based on print jobs 2152 stored in the terminal device 2. The server 3 functions as a web server and transmits, for each of the various screens, an HTML file for displaying the screen to the printing device 1.

Although the embodiment exemplifies the printing system 1000 including the single printing device 1, the number of printing devices 1 included in the printing system 1000 is not limited to one and may be two or more. In addition, although the embodiment exemplifies the printing system 1000 including the single terminal device 2, the number of terminal devices 2 included in the printing system 1000 is not limited to one and may be two or more.

Figure 2A:
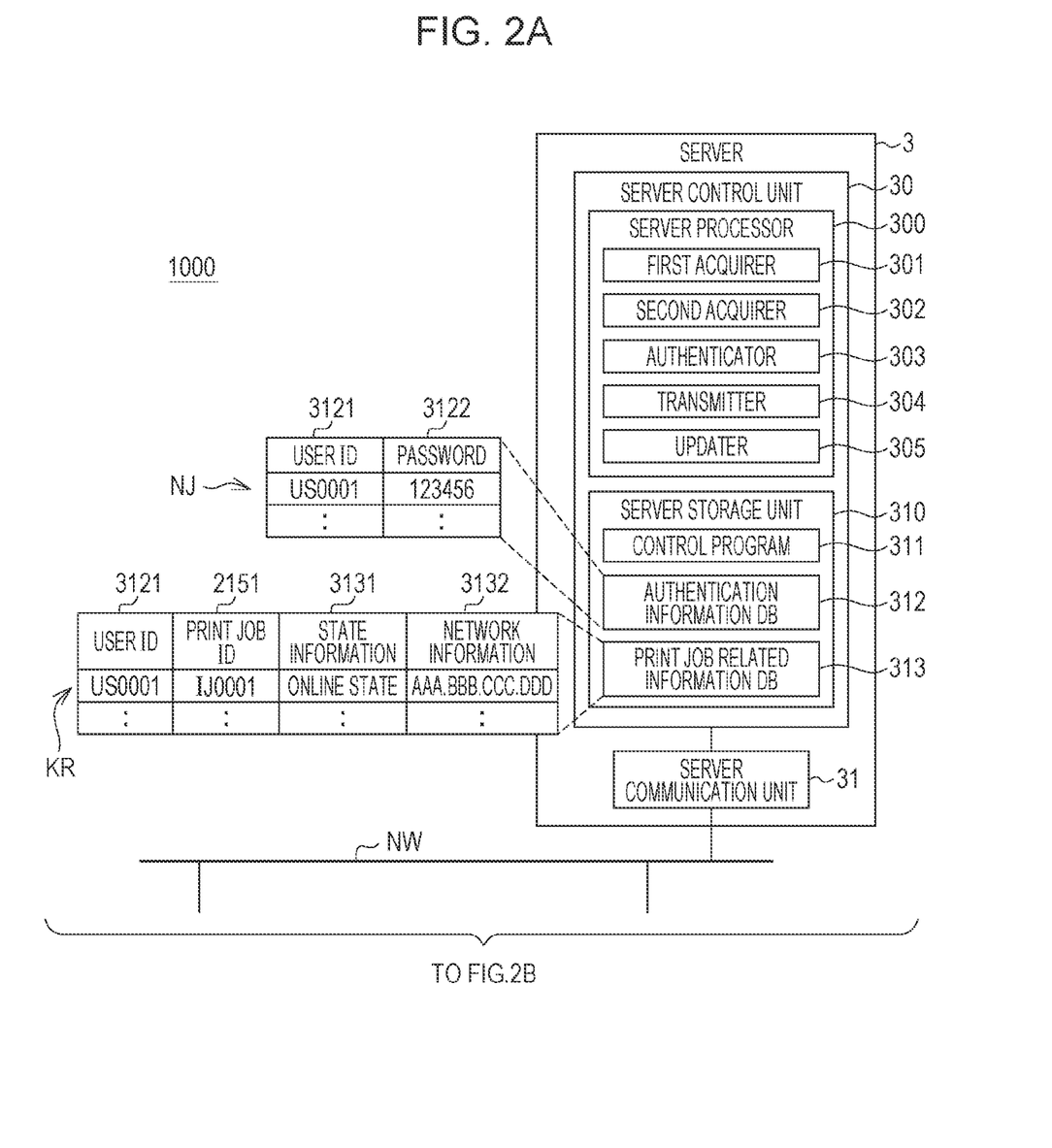
FIGS. 2A and 2B are diagrams illustrating functional configurations of a printing device, a terminal device, and a server.
Figure 2B:
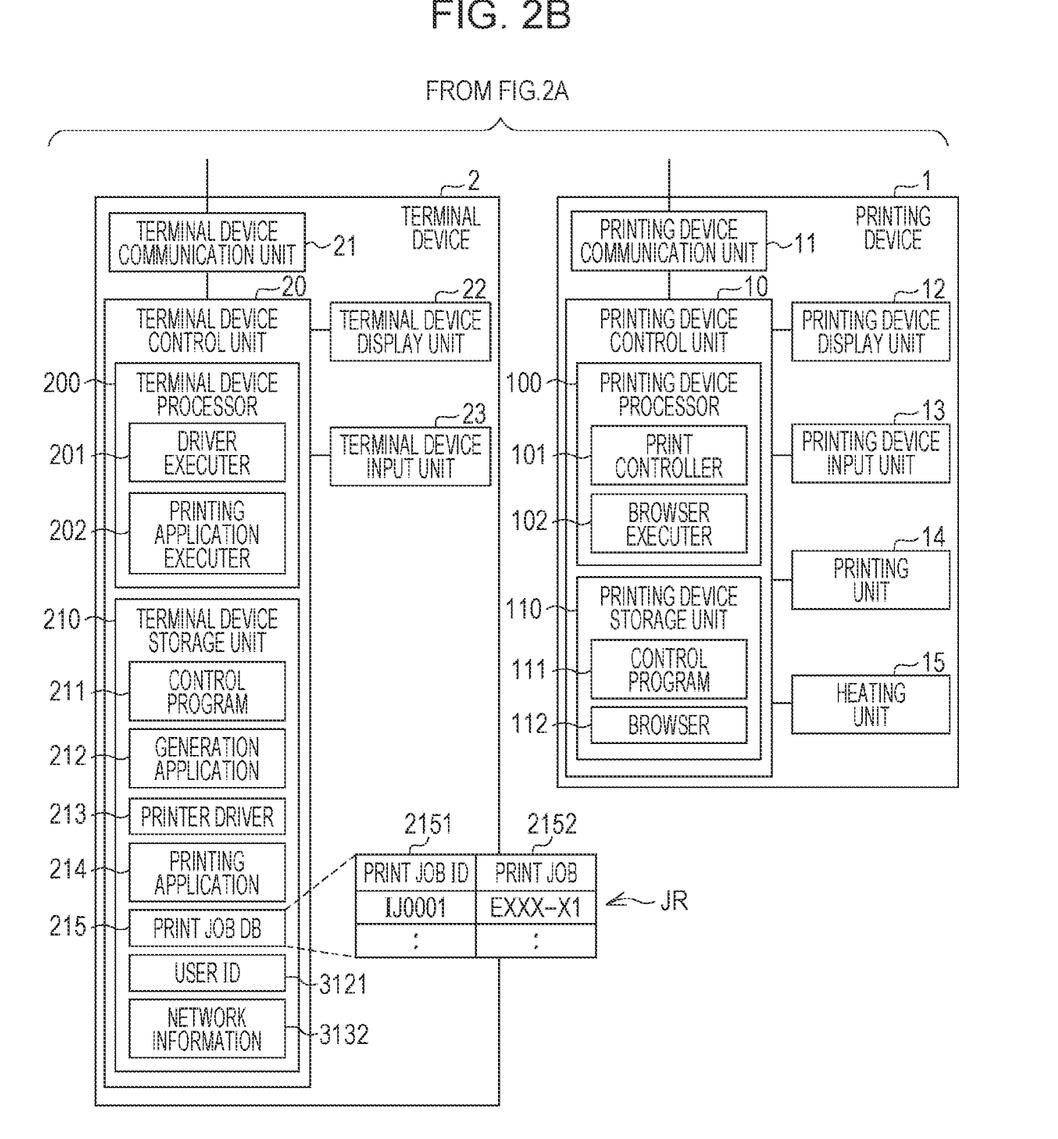

FIGS. 2A and 2B are block diagrams illustrating functional configurations of the printing device 1, the terminal device 2, and the server 3.

The printing device 1 includes a printing device control unit 10, a printing device communication unit 11, a printing device display unit 12, a printing device input unit 13, a printing unit 14, and a heating unit 15.

The printing device control unit 10 includes a printing device processor 100 and a printing device storage unit 110. The printing device processor 100 is a processor that is a central processing unit (CPU), a micro-processing unit (MPU), or the like and executes a program. The printing device control unit 10 controls each of the units of the printing device 1. In the printing device 10, the printing device processor 100 reads a control program 111 stored in the printing device storage unit 110 to cause hardware and software to perform various processes. The printing device control unit 10 functions as a print controller 101 by causing the printing device processor 100 to read and execute the control program 111. In addition, the printing device control unit 10 functions as a browser executor 102 by causing the printing device processor 100 to read and execute a browser 112.

The printing device storage unit 110 has a storage region storing the program to be executed by the printing device processor 100 and data to be processed by the printing device processor 100. The printing device storage unit 110 stores the control program 111 to be executed by the printing device processor 100, the browser 112, and other various data. The printing device storage unit 110 has a nonvolatile storage region. The printing device storage unit 110 also has a volatile storage region, which may constitute a work area of the printing device processor 100.

The printing device communication unit 11 includes communication hardware conforming to a predetermined communication standard and communicates with the terminal device 2 and the server 3 in accordance with the predetermined communication standard under control by the printing device control unit 10.

The printing device display unit 12 includes a plurality of light emitting diodes (LEDs) and a display panel. The printing device display unit 12 turns on and off the LEDs in a predetermined manner in accordance with control by the printing device control unit 10 or causes the LEDs to blink in a predetermined manner in accordance with control by the printing device control unit 10 and displays information on the display panel.

The printing device input unit 13 includes a first input section that is included in the printing device 1 and is an operational switch, a touch panel, or the like. The printing device input unit 13 detects an operation performed by the user P on the first input section and outputs a result of detecting the operation to the printing device control unit 10. The printing device control unit 10 executes processing corresponding to the operation performed on the first input section based on the input from the printing device input unit 13. The printing device input unit 13 includes a second input section for the user P to enter authentication information NJ into the printing device 1. An example of the second input section is a card reader that reads an IC card or the like that stores the authentication information NJ of the user P. The entry method by the user P is not limited to the method described above. For example, the user P may enter, as the authentication information NJ, a combination of a user ID 3121 and a password 3122 into the operation switch, the touch panel, or the like. The user P may enter the authentication information NJ into the operation switch, the touch panel, or the like for fingerprint authentication. Although the embodiment exemplifies the combination of the user ID 3121 and the password 3122 as the authentication information NJ, the authentication information NJ is not limited thereto and may be, for example, information indicating a fingerprint instead of the password 3122 in the case where the fingerprint authentication is performed.

The printing unit 14 has a configuration relating to printing. That is, the printing unit 14 includes an ink jet head that ejects ink to form a dot on the print medium, a carriage that causes the ink jet head to operate in a scan direction, a carriage drive motor that drives the carriage, a transport unit that transports the print medium, an ink supply unit that supplies the ink to the ink jet head, and the like. The printing unit 14 performs the printing on the print medium by ejecting the ink from a nozzle of the ink jet head to form the dot on a print surface of the transported print medium in accordance with control by the printing device control unit 10.

The heating unit 15 includes a heater that dries the ink to fix the ink to the print medium and heats the print medium transported on a transport path under control by the printing device control unit 10.

The terminal device 2 includes a terminal device control unit 20, a terminal device communication unit 21, a terminal device display unit 22, and a terminal device input unit 23.

The terminal device control unit 20 includes a terminal device processor 200 and a terminal device storage unit 210. The terminal device processor 200 is a processor that is a CPU, an MPU, or the like and executes a program. The terminal device control unit 20 controls each of the units of the terminal device 2. In the terminal device control unit 20, the terminal device processor 200 reads a control program 211 stored in the terminal device storage unit 210 to cause hardware and software to perform various processes. The terminal device control unit 20 functions as a driver executor 201 by causing the terminal device processor 200 to read and execute the printer driver 213 stored in the terminal device storage unit 210. In addition, the terminal device control unit 20 functions as a printing application executor 202 by causing the terminal device processor 200 to read and execute the printing application 214 stored in the terminal device storage unit 210.

The printing application executor 202 corresponds to an example of a "print job information transmitter".

The terminal device storage unit 210 has a storage region storing the program to be executed by the terminal device processor 200 and data to be executed by the terminal device processor 200. The terminal device storage unit 210 stores the control program 211 to be executed by the terminal device processor 200, a generation application 212, the printer driver 213, the printing application 214, a print job DB 215, the user ID 3121, network information 3132, and other various data. The terminal device storage unit 210 has a nonvolatile storage region. The terminal device storage unit 210 also has a volatile storage region, which may constitute a work area of the terminal device processor 200.

The generation application 212 is an application program that generates data such as a document, an image, or the like.

The printer driver 213 is a program that generates the print job 2152 based on the data generated by the generation application 212. The print job 2152 includes a print command, a printing condition such as the number of print sheets, and the data generated by the generation application 212. The print command is a command corresponding to a command specification of the printing device 1.

The printing application 214 is an application program that executes processing relating to the print job 2152 generated by the printer driver 213.

The print job DB 215 is a database that stores the print job 2152. One record of the print job DB 215 includes a print job ID 2151 and the print job 2152.

In the following description, a record of the print job DB 215 is referred to as "print job record" and indicated by a reference sign "JR".

The print job ID 2151 is identification information of the print job 2152.

The terminal device communication unit 21 includes communication hardware conforming to the predetermined communication standard and communicates with the printing device 1 and the server 3 in accordance with control by the terminal device control unit 20.

The terminal device display unit 22 includes an LED, a display panel, and the like and displays various information in accordance with control by the terminal device control unit 20.

The terminal device input unit 23 includes an input section that is included in the terminal device 2 and is an operational switch, a touch panel, or the like. The terminal device input unit 23 detects an operation performed by the user P on the input section and outputs a result of detecting the operation to the terminal device control unit 20. The terminal device control unit 20 executes processing corresponding to the operation performed on the input section.

The server 3 includes a server control unit 30 and a server communication unit 31.

The server control unit 30 includes a server processor 300 and a server storage unit 310. The server processor 300 is a processor that is a CPU, an MPU, or the like and executes a program. The server control unit 30 controls each of the units of the server 3. In the server control unit 30, the server processor 300 reads a control program 311 stored in the server storage unit 310 to cause hardware and software to perform various processes. The server control unit 30 functions as a first acquirer 301, a second acquirer 302, an authenticator 303, a transmitter 304, and an updater 305 by reading and executing the control program 311.

The server storage unit 310 corresponds to an example of a "storage unit".

The server storage unit 310 has a storage region storing the program to be executed by the server processor 300 and data to be processed by the server processor 300. The server storage unit 310 stores the control program 311 to be executed by the server processor 300, an authentication information DB 312, a print job related information DB 313, and other various data. The server storage unit 310 has a nonvolatile storage region. The server storage unit 310 also has a volatile storage region, which may constitute a work area of the server processor 300.

The authentication information DB 312 is a database that stores the authentication information NJ as a record. The one record stored in the authentication information DB 312 includes the single combination of the user ID 3121 and the password 3122.

The user ID 3121 is identification information identifying the user P in authentication printing. A user ID 3121 is assigned to each user P in advance.

The password 3122 is used for user authentication. The password 3122 may be set by the user P or may be set by the server 3.

The print job related information DB 313 is a database that stores information on the print job 2152. One record stored in the print job related information DB 313 includes the user ID 3121, the print job ID 2151, state information 3131, and the network information 3132.

In the following description, a record of the print job related information DB 313 is referred to as "print job related information record" and indicated by a reference sign "KR".

The print job related information record KR corresponds to an example of "association information".

The state information 3131 indicates the state of the terminal device 2 that stores the print job 2152 identified by the print job ID 2151 associated with the state information 3131 in the one record. The state indicated by the state information 3131 indicates an online state or an offline state. The online state indicates a state in which the terminal device 2 is connected to the network NW and the print job 2152 is transmittable to the printing device 1. The offline state indicates a state in which the terminal device 2 is disconnected from the network and the print job 2152 is not transmittable to the printing device 1.

The network information 3132 is information identifying, in the network NW, the terminal device 2 that stores the print job 2152 identified by the print job ID 2151 associated with the network information 3132 in the one record. The embodiment exemplifies an IP address as the network information 3132. The network information 3132 is not limited to the IP address and may be other information such as a MAC address or may include the other information.

The server communication unit 31 includes communication hardware conforming to the predetermined communication standard and communicates with the printing device 1 and the terminal device 2 in accordance with control by the server control unit 30.

As described above, the server control unit 30 functions as the first acquirer 301, the second acquirer 302, the authenticator 303, the transmitter 304, and the updater 305.

The first acquirer 301 receives information from the printing device 1 by using the server communication unit 31, thereby acquiring the information from the printing device 1.

The second acquirer 302 receives information from the printing device 1 by using the server communication unit 31, thereby acquiring the information from the printing device 1.

The authenticator 303 performs user authentication based on the authentication information NJ input to the printing device 1.

The transmitter 304 transmits information to the terminal device 2 and the printing device 1 by using the server communication unit 31.

The updater 305 updates information stored in the print job related information DB 313.

Next, an operation of the printing system 1000 is described together with detailed description of functional sections of the printing device control unit 10, the terminal device control unit 20, and the server control unit 30.

The operation of the printing system 1000 in authentication printing is described.

First, an operation of the printing system 1000 that is performed until the user P registers the print job 2152 in the server 3 in the authentication printing is described. In the embodiment, registering the print job 2152 in the server 3 means newly storing a print job related information record relating to the print job 2152 generated by the terminal device 2 in the print job related information DB 313 stored in the server 3.

Figure 3:
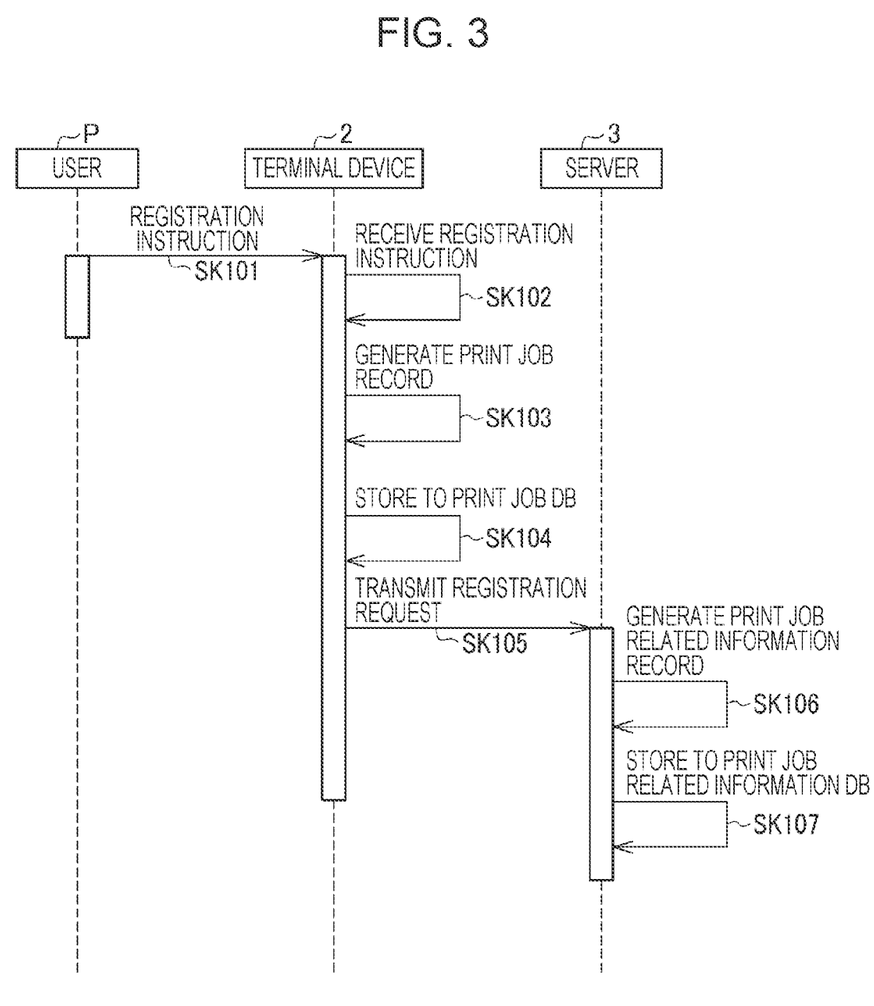
FIG. 3 is a sequence diagram illustrating an operation of the printing system.

FIG. 3 is a sequence diagram illustrating the operation of the printing system 1000.

It is assumed that, at a start time point in the sequence diagram of FIG. 3, the driver executer 201 has already generated the print job 2152 based on an operation of the user P.

The user P gives, to the terminal device 2, a registration instruction to register the print job 2152 generated by the terminal device 2 in the server 3 (step SK101).

When the printing application executer 202 of the terminal device 2 receives the registration instruction from the user P (step SK102), the printing application executor 202 generates a print job record JR (step SK103).

The print job record JR generated in step SK103 includes the print job 2152 generated by the driver executer 201 and the print job ID 2151 of the print job 2152. The print job ID 2151 may be generated by the printing application executer 202 or may be generated by the driver executer 201.

After step SK103, the printing application executer 202 stores the print job record JR generated in step SK103 to the print job DB 215 (step SK104).

The printing application executer 202 transmits a registration request to the server 3 by using the terminal device communication unit 21 (step SK105).

The registration request transmitted in step SK105 includes the network information 3132 stored in the terminal device storage unit 210, the user ID 3121 stored in the terminal device storage unit 210, and the print job ID 2151 included in the print job record JR generated in step SK103.

When the second acquirer 302 of the server 3 receives the registration request from the terminal device 2 by using the server communication unit 31, the second acquirer 302 generates a print job related information record KR based on the received registration request (step SK106).

The print job related information record KR generated in step SK106 includes the user ID 3121, the print job ID 2151, and the network information 3132 that are included in the received registration request, and the state information 3131 indicating the printable state.

After the second acquirer 302 generates the print job related information record KR, the second acquirer 302 stores the generated print job related information record KR to the print job related information DB 313 (step SK107).

Figure 4:
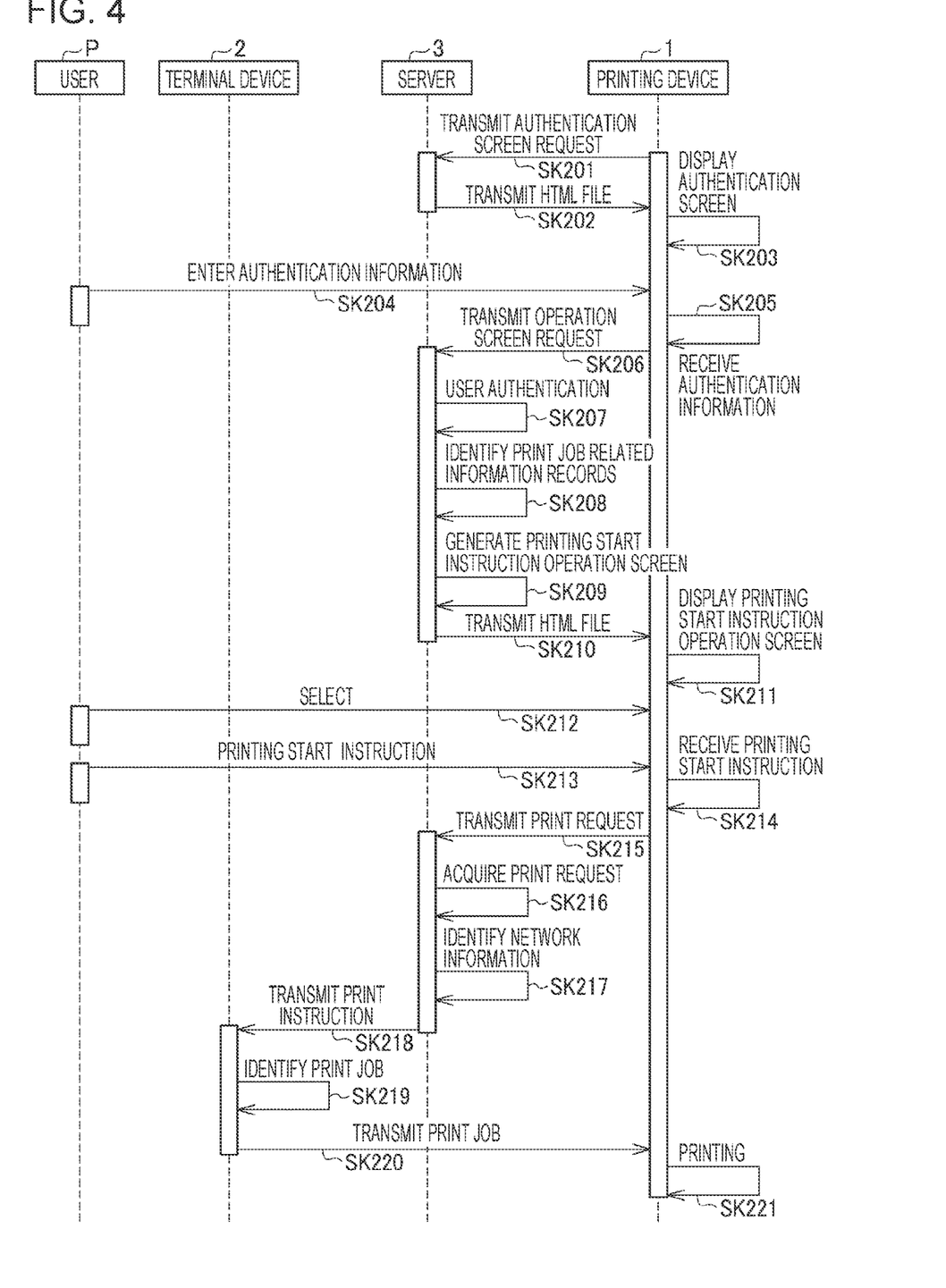
FIG. 4 is a sequence diagram illustrating an operation of the printing system.

Next, an operation of the printing system 1000 in the case where the printing device 1 performs printing based on the print job 2152 registered in the server 3 in authentication printing is described.

FIG. 4 is a sequence diagram illustrating the operation of the printing system 1000.

The browser executer 102 of the printing device 1 transmits an authentication screen request to the server 3 by using the printing device communication unit 11 (step SK201).

The authentication screen request is information requesting an HTML file for displaying an authentication screen relating to user authentication.

When the first acquirer 301 receives the authentication screen request by using the server communication unit 31, the transmitter 304 of the server 3 transmits the HTML file for displaying the authentication screen to the printing device 1 by using the server communication unit 31 (step SK202).

When the browser executer 102 of the printing device 1 receives, from the server 3, the HTML file for displaying the authentication screen by using the printing device communication unit 11, the browser executer 102 displays the authentication screen by using the printing device display unit 12 (step SK203).

The authentication screen includes, for example, information that prompts the user P to enter the authentication information NJ and is a message "Please hold an IC card over the card reader.", "Please enter a user ID and a password.", or the like, for example.

The user P enters the authentication information NJ into the printing device 1 based on the authentication screen displayed by the printing device 1 (step SK204).

The browser executer 102 of the printing device 1 receives the authentication information NJ entered by the user P (step SK205).

After step SK205, the browser executer 102 transmits an operation screen request to the server 3 by using the printing device communication unit 11 (step SK206).

The operation screen request is information requesting an HTML file for displaying a printing start instruction operation screen. The printing start instruction operation screen is a screen for the user P to perform an operation to give a printing start instruction. The operation screen request includes the authentication information NJ entered by the user P.

When the first acquirer 301 receives the operation screen request by using the server communication unit 31, the authenticator 303 of the server 3 performs the user authentication based on the authentication information NJ included in the received operation screen request (step SK207).

In step SK207, the authenticator 303 references the authentication information DB 312 and determines whether the authentication information NJ included in the received operation screen request is already stored as one record in the authentication information DB 312. When the authenticator 303 determines that the authentication information NJ is not stored, the authenticator 303 determines that the user authentication failed. When the authenticator 303 determines that the authentication information NJ is already stored, the authenticator 303 determines that the user authentication was successful.

When the authenticator 303 determines that the user authentication was successful, the authenticator 303 identifies, from the print job related information DB 313, all print job related information records KR including the user ID 3121 successfully authenticated in the user authentication (step SK208).

The authenticator 303 generates the printing start instruction operation screen for the user P to perform an operation to give a printing start instruction for the print job 2152 identified by the print job ID 2151 included in the identified print job related information records KR (step SK209).

The printing start instruction operation screen is a screen displaying a list of print job IDs 2151 associated with the state information 3131 and identifying print jobs 2152 of the user P successfully authenticated in the user authentication. The printing start instruction operation screen includes a software button for selecting one or multiple print job IDs 2151 from the list of the print job IDs 2151. The printing start instruction operation screen also includes a software button to be operated by the user P to give a printing start instruction, for example.

The transmitter 304 transmits, to the printing device 1, the HTML file for displaying the printing start instruction operation screen generated by the authenticator 303 by using the server communication unit 31 (step SK210).

When the authenticator 303 determines that the user authenticator failed, the HTML file for displaying the printing start instruction operation screen is not transmitted to the printing device 1.

When the browser executer 102 of the printing device 1 receives the HTML file for displaying the printing start instruction operation screen by using the printing device communication unit 11, the browser executer 102 displays the printing start instruction operation screen by using the printing device display unit 12 (step SK211).

As described above, the printing start instruction operation screen is a screen for displaying a list of print job IDs 2151 associated with the state information 3131. Therefore, the user P visually recognizes the printing start instruction operation screen, thereby being able to recognize whether the terminal device 2 is in the offline state or the online state for each print job 2152 and to easily determine a print job 2152 that currently enables printing to be performed.

The user P selects, on the printing start instruction operation screen displayed by the printing device 1, one or multiple print jobs 2152 that cause the printing device 1 to perform printing (step SK212).

The user P performs an operation to give a printing start instruction on the printing start instruction operation screen displayed by the printing device 1 (step SK213).

The browser executer 102 of the printing device 1 receives the printing start instruction given by the user P (step SK214).

Upon receiving the printing start instruction, the browser executer 102 transmits, to the server 3, a print request to start printing by using the printing device communication unit 11 (step SK215).

The print request transmitted in step SK215 includes all one or multiple print job IDs 2151 of the one or multiple print jobs 2152 selected by the user P in step SK212.

The first acquirer 301 of the server 3 acquires the print request from the printing device 1 by using the server communication unit 31 (step SK216).

After step SK216, the transmitter 304 references the print job related information DB 313 and identifies the network information 3132 associated with the one or multiple print job IDs 2151 included in the print request acquired by the first acquirer 301 (step SK217).

After step SK217, the transmitter 304 transmits a print instruction to the terminal device 2 based on the identified network information 3132 by using the server communication unit 31 (step SK218).

The print instruction transmitted in step SK218 is information indicating an instruction to transmit the one or multiple print jobs 2152 to the printing device 1 and includes the one or multiple print job IDs 2151 included in the print request acquired in step SK216. The print instruction includes identification information identifying, in the network NW, the printing device 1 that transmitted the print request.

When the printing application executer 202 of the terminal device 2 receives the print instruction by using the terminal device communication unit 21, the printing application executer 202 identifies, from the print job DB 215, the one or multiple print jobs 2152 identified by the one or multiple print job IDs 2151 included in the print instruction (step SK219).

After step SK219, the printing application executer 202 transmits the identified one or multiple print jobs 2152 to the printing device 1 by using the terminal device communication unit 21 (step SK220).

When the print controller 101 of the printing device 1 receives the one or multiple print jobs 2152 by using the printing device communication unit 11, the print controller 101 controls the printing unit 14 and the heating unit 15 to perform printing based on the received one or multiple print jobs 2152 (step SK221).

Figure 5:
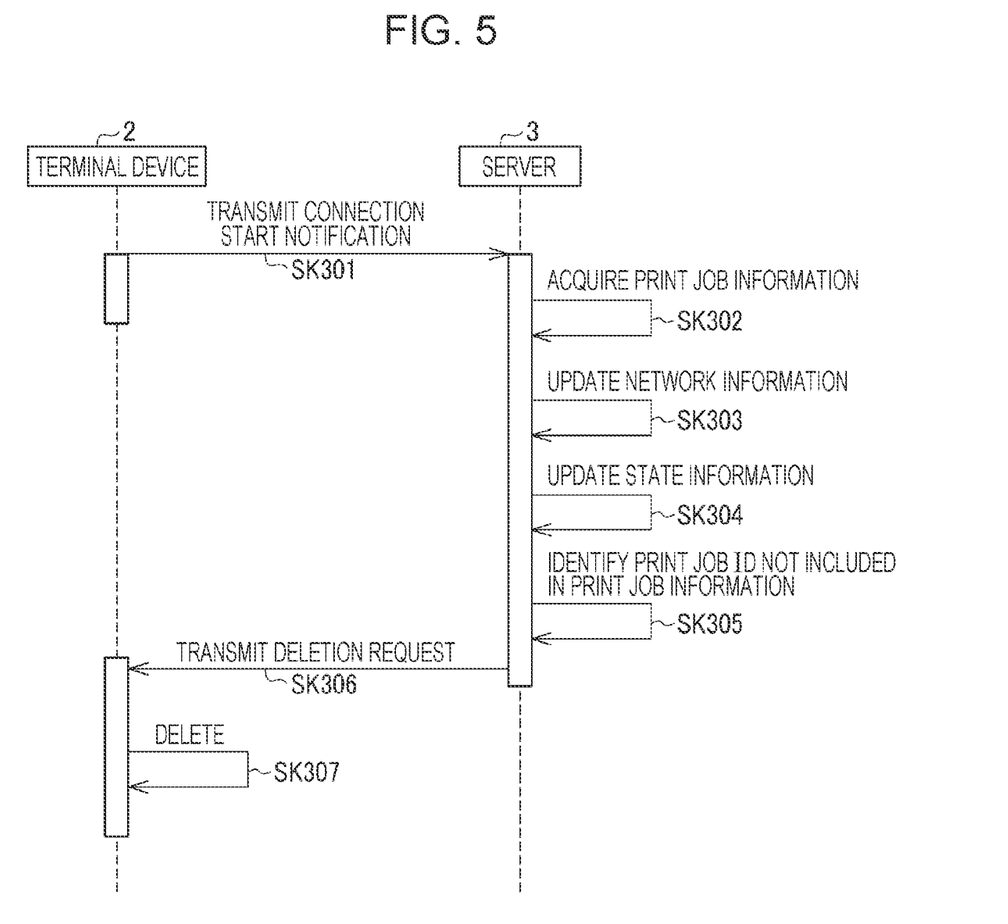
FIG. 5 is a sequence diagram illustrating an operation of the printing system.

Next, an operation of the printing system 1000 when the terminal device 2 is connected to the network NW is described. For example, the terminal device 2 is connected to the network NW when the terminal device 2 returns to a normal state from a sleep state, a power supply for the terminal device 2 is turned on from an off state, the network information 3132 on the network NW is changed, or the like.

FIG. 5 is a sequence diagram illustrating the operation of the printing system 1000.

When the terminal device 2 is connected to the network NW, the printing application executer 202 of the terminal device 2 transmits a connection start notification to the server 3 by using the terminal device communication unit 21 (step SK301).

The connection start notification transmitted in step SK301 includes print job information. The print job information includes all print job IDs 2151 stored in the print job DB 215, the network information 3132 stored in the terminal device storage unit 210, and the user ID 3121 stored in the terminal device storage unit 210.

The second acquirer 302 of the server 3 receives the connection start notification by using the server communication unit 31, thereby acquiring the print job information from the terminal device 2 (step SK302).

After step SK302, the updater 305 references the print job related information DB 313 and updates the network information 3132 associated with the print job IDs 2151 and the user ID 3121 that are included in the print job information acquired by the second acquirer 302 to the network information 3132 included in the print job information acquired by the second acquirer 302 (step SK303).

Due to this update, when the network information 3132 of the terminal device 2 is changed within a period of time from the time when the user P registers a print job 2152 in the server 3 to the time when the printing device 1 performs printing, the user P can update the network information 3132 included in the print job related information record KR to appropriate network information 3132. Therefore, when the network information 3132 of the terminal device 2 is changed within the period of time from the time when the user P registers the print job 2152 in the server 3 to the time when the printing device 1 performs the printing, the server 3 can reliably transmit a print instruction to the terminal device 2.

After step SK303, the updater 305 references the print job related information DB 313 and updates the state information 3131 associated with the print job IDs 2151 and the user ID 3121 that are included in the print job information acquired by the second acquirer 302 to the state information 3131 indicating the online state (step SK304).

After step SK304, the transmitter 304 references the print job related information DB 313 and identifies a print job ID 2151 not included in the print job information acquired by the second acquirer 302 from the print job IDs 2151 associated with the user ID 3121 included in the print job information acquired by the second acquirer 302 (step SK305).

When the transmitter 304 identifies the print job ID 2151 in step SK305, the transmitter 304 transmits a deletion request to delete a print job 2152 to the terminal device 2, which is a source of the print job information acquired in step SK302, by using the server communication unit 31 (step SK306).

The deletion request transmitted in step SK306 includes the print job ID 2151 identified in step SK305.

When the printing application executer 202 of the terminal device 2 receives the deletion request by using the terminal device communication unit 21, the printing application executer 202 deletes, from the print job DB 215, a print job record JR including the print job ID 2151 included in the received deletion request (step SK307).

Figure 6:
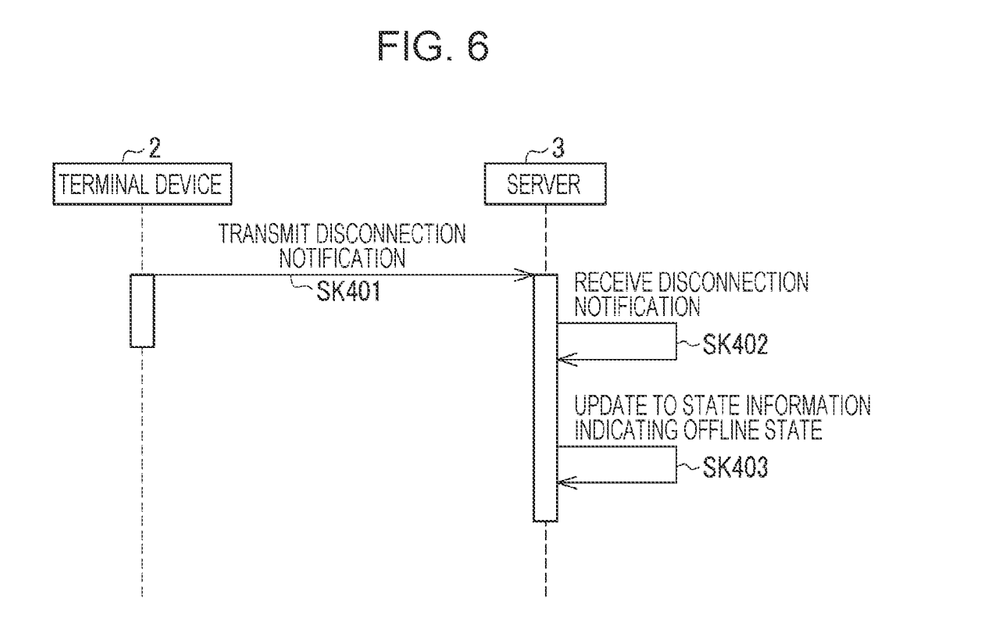
FIG. 6 is a sequence diagram illustrating an operation of the printing system.

Next, an operation of the printing system 1000 when the terminal device 2 is disconnected from the network NW is described. For example, the terminal device 2 is disconnected from the network NW when the terminal device 2 transitions to the sleep state, the power supply for the terminal device 2 is turned off, or the like.

FIG. 6 is a sequence diagram illustrating the operation of the printing system 1000.

When the terminal device 2 is disconnected from the terminal device 2, the printing application executer 202 of the terminal device 2 transmits a disconnection notification to the server 3 (step SK401).

The disconnection notification transmitted in step SK401 includes the network information 3132 and the user ID 3121 that are stored in the terminal device storage unit 210.

The second acquirer 302 of the server 3 receives the disconnection notification by using the server communication unit 31 (step SK402).

After step SK402, the updater 305 updates the state information 3131 associated with a combination of the network information 3132 and the user ID 3121 that are included in the received disconnection notification to the state information 3131 indicating the offline state (step SK403).

When the network connection state of the terminal device 2 is changed due to the update of the state information 3131 illustrated in FIGS. 5 and 6 within the period of time from the time when the user P registers the print job 2152 in the server 3 to the time when the printing device 1 performs the printing, the state information 3131 included in the print job related information record KR can be updated to appropriate state information 3131 in accordance with the change in the state of the network connection. Therefore, the server 3 can provide the printing start instruction operation screen with the displayed appropriate state information 3131 to the user P.

Modification

Next, a modification of the aforementioned embodiment is described.

The embodiment describes the configuration in which, when the terminal device 2 is connected to the network NW, the network information 3132 and the state information 3131 are updated.

In the modification, in the case where the network information 3132 when the terminal device 2 is reconnected to the network NW is not different from the network information 3132 when the terminal device 2 is disconnected from the network NW, only the state information 3131 is updated.

Figure 7:
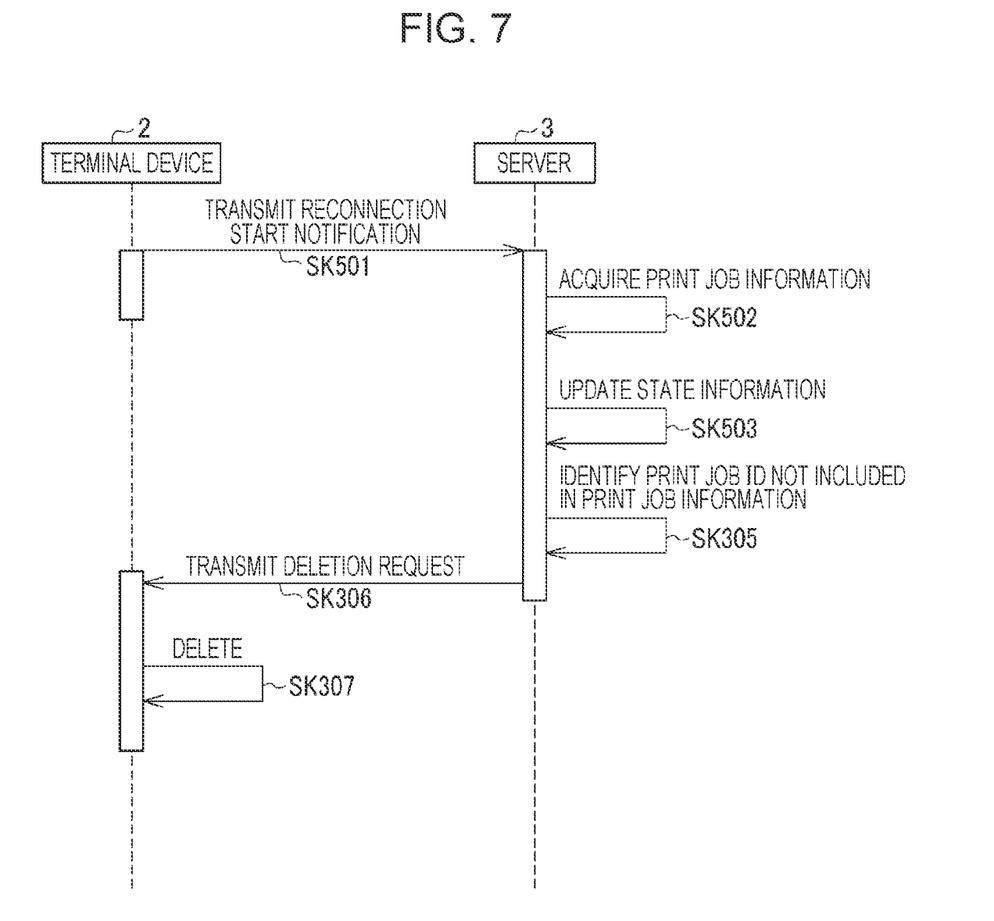
FIG. 7 is a sequence diagram illustrating an operation of the printing system.

FIG. 7 is a sequence diagram illustrating an operation of the printing system 1000.

The same steps as those illustrated in the sequence diagram of FIG. 5 are indicated by the same step numbers in FIG. 7, and detailed description thereof is omitted.

In the case where the network information 3132 when the terminal device 2 is reconnected to the network NW is not different from the network information 3132 when the terminal device 2 is disconnected from the network NW, the printing application executer 202 of the terminal device 2 transmits a reconnection start notification to the server 3 by using the terminal device communication unit 21 (step SK501).

The reconnection start notification transmitted in step SK501 includes print job information.

The second acquirer 302 of the server 3 receives the reconnection start notification by using the server communication unit 31, thereby acquiring the print job information from the terminal device 2 (step SK502).

After step SK502, the updater 305 references the print job related information DB 313 and updates the state information 3131 associated with a print job ID 2151 included in the reconnection start notification acquired by the second acquirer 302 to the state information 3131 indicating the online state (step SK503).

As described above, the server 3 is configured to communicate via the network NW with the terminal device 2 that stores a print job 2152 and the printing device 1 that performs printing based on the print job 2152 received from the terminal device 2. The server 3 includes the server storage unit 310 that stores a print job related information record KR in which a print job ID 2151 is associated with the network information 3132 of the terminal device 2, the first acquirer 301 that acquires a print request from the printing device 1, the transmitter 304 that transmits a print instruction to the terminal device 2 based on the network information 3132 stored in the server storage unit 310 and associated with the print job ID 2151 included in the acquired print request when the first acquirer 301 acquires the print request, the second acquirer 302 that acquires print job information from the terminal device 2, and the updater 305 that updates, based on the acquired print job information, the print job related information record KR stored in the server storage unit 310 and including the print job ID 2151 included in the acquired print job information.

In addition, the printing system 1000 includes the terminal device 2 that stores a print job 2152, the printing device 1 that performs printing based on the print job 2152 received from the terminal device 2, and the server 3 configured to communicate with the terminal device 2 and the printing device 1 via the network NW.

The terminal device 2 includes the printing application executer 202 that transmits print job information to the server 3.

The server 3 includes the server storage unit 310 that stores a print job related information record KR in which a print job ID 2151 is associated with the network information 3132 of the terminal device 2, the first acquirer 301 that acquires a print request from the printing device 1, the transmitter 304 that transmits a print instruction to the terminal device 2 based on the network information 3132 stored in the server storage unit 310 and associated with the print job ID 2151 included in the acquired print request when the first acquires 301 acquires the print request, the second acquirer 302 that acquires the print job information from the terminal device 2, and the updater 305 that updates, based on the acquired print job information, the print job related information record KR stored in the server storage unit 310 and including the print job ID 2151 included in the acquired print job information.

According to the server 3 and the printing system 1000, the print job related information record KR is updated based on the print job information received from the terminal device 2. When the network information 3132 of the terminal device 2 is changed, the information of the print job related information record KR can be updated to appropriate information. Therefore, according to the server 3 and the printing system 1000, when the network information 3132 of the terminal device 2 is changed, the server 3 can transmit the print instruction to the terminal device 2.

When the second acquirer 302 acquires the print job information, the updater 305 updates the network information 3132 stored in the server storage unit 310 and associated with the print job ID 2151 included in the acquired print job information to the network information 3132 included in the acquired print job information.

According to the above description, the network information 3132 is updated based on the print job information received from the terminal device 2. When the network information 3132 of the terminal device 2 is changed, the network information 3132 included in the print job related information record KR can be appropriate network information 3132. Therefore, when the network information 3132 of the terminal device 2 is changed, the server 3 can reliably transmit the print instruction to the terminal device 2.

When the terminal device 2 is connected to the network NW, the second acquirer 302 acquires the print job information from the terminal device 2.

According to the above description, after the terminal device 2 is connected to the network NW, the network information 3132 included in the print job related information record KR can be quickly updated to appropriate network information 3132. When the network information 3132 of the terminal device 2 is changed, it is possible to reduce the possibility that the server 3 may not transmit the print instruction to the terminal device 2.

The server storage unit 310 stores the print job related information record KR in which the print job ID 2151, the network information 3132, and the state information 3131 are associated with each other.

When the terminal device 2 is disconnected from the network NW, the updater 305 updates the state information 3131 stored in the server storage unit 310 and associated with the network information 3132 of the terminal device 2 disconnected from the network NW to the state information 3131 indicating the offline state.

According to the above description, when the terminal device 2 is disconnected from the network NW, the server 3 can hold the information indicating that the terminal device 2 is in the offline state. Therefore, when the terminal device 2 is disconnected from the network NW, the server 3 can provide, to the user P, the information indicating that the terminal device 2 is in the offline state.

When the terminal device 2 is reconnected to the network NW, the second acquirer 302 acquires the print job information from the terminal device 2.

The updater 305 updates the state information 3131 stored in the server storage unit 310 and associated with the network information 3132 of the reconnected terminal device 2 to the state information 3131 indicating the online state. In addition, the updater 305 updates the network information 3132 stored in the server storage unit 310 and associated with the print job ID 2151 included in the print job information acquired from the reconnected terminal device 2 to the network information 3132 included in the acquired print job information.

According to the above description, when the terminal device 2 is reconnected to the network NW, the state information 3131 and the network information 3132 are updated. Therefore, the information included in the print job related information record KR can be updated to appropriate information in accordance with the state of the network connection and the change in the network information 3132.

When the terminal device 2 is reconnected to the network NW, and the network information 3132 when the terminal device 2 is reconnected to the network NW is not different from the network information 3132 when the terminal device 2 is disconnected from the network NW, the updater 305 updates the state information 3131 stored in the server storage unit 310 and associated with the network information 3132 of the reconnected terminal device 2 to the state information 3131 indicating the printable state and does not update the network information 3132.

According to the above description, the information included in the print job related information record KR can be updated to appropriate information in accordance with the change in the state of the network connection, and it is possible to prevent an unnecessary update of information.

When the server storage unit 310 does not store the print job ID 2151 included in the print job information acquired by the second acquirer 302, the transmitter 304 transmits a deletion request to the terminal device 2 that transmitted the print job information acquired by the second acquirer 302.

According to the above description, the terminal device 2 can delete the print job 2152 not stored in the server 3 based on the deletion request. The print job 2152 not stored in the server 3 is likely to be unnecessary for the user P. Therefore, the server 3 can suppress a load on storage in a storage region of the terminal device 2 due to the unnecessary print job 2152.

The network information 3132 includes the IP address.

According to the above description, when the IP address of the terminal device 2 is changed, the server 3 can transmit the print instruction to the terminal device 2.

The aforementioned embodiment and the modification indicate aspects and can be arbitrarily modified and applied.

For example, in the embodiment and the modification, the large format printer is exemplified as the printing device, but the printing device is not limited to the large format printer. In the embodiment and the modification, as the printing device, a multifunctional machine having a function such as a scan function as well as a printing function, and various printing devices such as a textile printing machine that performs textile printing can be used.

In addition, the functions of the printing device control unit 10, the terminal device control unit 20, and the server control unit 30 may be enabled by a plurality of processors or a semiconductor chip.

The units illustrated in FIGS. 2A and 2B are an example and the specific implementation of the units is not particularly limited. That is, hardware corresponding to each of the units may not be implemented. The functions of the units may be enabled by a single processor executing a program. In addition, in the aforementioned embodiment, some of the functions enabled by the software may be enabled by hardware or some of the functions enabled by the hardware may be enabled by software. The specific detailed configurations of the other units of the printing device 1, the terminal device 2, and the server 3 may be arbitrarily modified without departing from the gist of the present disclosure.

In addition, for example, the steps of the operations illustrated in FIGS. 3 to 7 are obtained by dividing the operations based on the details of the processes in order to easily understand the operations of the units of the printing system 1000. The present disclosure is not limited by how the operations are divided into steps based on the details of the processes and by the names of the steps. Each of the operations may be divided into a larger number of steps based on the details of the processes. In addition, each of the operations may be divided into steps such that each of the steps includes a larger number of processes. The order of the steps may be changed within the scope of the present disclosure.

What is claimed is:

1. A server configured to communicate via a network with a terminal device that stores a print job and a printing device that performs printing based on the print job received from the terminal device, the server comprising:
   a storage that stores association information in which identification information of the print job is associated with network information of the terminal device;
   a first acquirer that acquires a print request including the identification information from the printing device;
   a transmitter that transmits, to the terminal device, a print instruction to transmit the print job indicated by the identification information included in the acquired print request based on the network information stored in the storage and associated with the identification information included in the acquired print request when the first acquirer acquires the print request;
   a second acquirer that acquires print job information including the identification information and the network information from the terminal device; and
   an updater that updates, based on the acquired print job information, the association information stored in the storage and including the identification information included in the acquired print job information when the second acquirer acquires the print job information.

2. The server according to claim 1, wherein
when the second acquirer acquires the print job information, the updater updates the network information stored in the storage and associated with the identification information included in the acquired print job information to the network information included in the acquired print job information.

3. The server according to claim 1, wherein
when the terminal device is connected to the network, the second acquirer acquires the print job information from the terminal device.

4. The server according to claim 1, wherein
the storage stores the association information in which the identification information is associated with the network information and state information associated with the network information and indicating that the terminal device is in a transmittable state in which the print job is transmittable to the printing device or indicating that the terminal device is in a non-transmittable state in which the print job is not transmittable to the printing device, and
when the terminal device is disconnected from the network, the updater updates the state information stored in the storage and associated with the network information of the terminal device disconnected from the network to the state information indicating the non-transmittable state.

5. The server according to claim 4, wherein
the second acquirer acquires the print job information from the terminal device when the terminal device is reconnected to the network,
the updater updates the state information stored in the storage and associated with the network information of the reconnected terminal device to the state information indicating the transmittable state, and
the updater updates, to the network information included in the acquired print job information, the network information stored in the storage and associated with the identification information included in the print job information acquired from the reconnected terminal device.

6. The server according to claim 4, wherein
when the terminal device is reconnected to the network, and the network information when the terminal device is reconnected to the network is not different from the network information when the terminal device is disconnected from the network, the updater updates the state information stored in the storage and associated with the network information of the reconnected terminal device to the state information indicating the transmittable state and does not update the network information.

7. The server according to claim 1, wherein
when the storage does not store the identification information included in the print job information acquired by the second acquirer, the transmitter transmits a deletion request to delete the print job indicated by the identification information to the terminal device that transmitted the print job information acquired by the second acquirer.

8. The server according to claim 1, wherein the network information includes an IP address.

9. A printing system comprising:
a terminal device that stores a print job;
a printing device that performs printing based on the print job received from the terminal device; and
a server configured to communicate with the terminal device and the printing device via a network, wherein
the terminal device includes a print job information transmitter that transmits, to the server, print job information including identification information of the print job and network information of the terminal device, and
the server includes
a storage that stores association information in which the identification information is associated with the network information, a first acquirer that acquires a print request including the identification information from the printing device, a transmitter that transmits, to the terminal device, a print instruction to transmit the print job indicated by the identification information included in the acquired print request based on the network information stored in the storage and associated with the identification information included in the acquired print request when the first acquirer acquires the print request, a second acquirer that acquires the print job information from the terminal device, and an updater that updates, based on the acquired print job information, the association information stored in the storage and including the identification information included in the acquired print job information when the second acquirer acquires the print job information.

* * * * *